Dec. 8, 1936.   W. B. MILLER   2,063,182
ARC WELDING ELECTRODE
Filed April 15, 1933
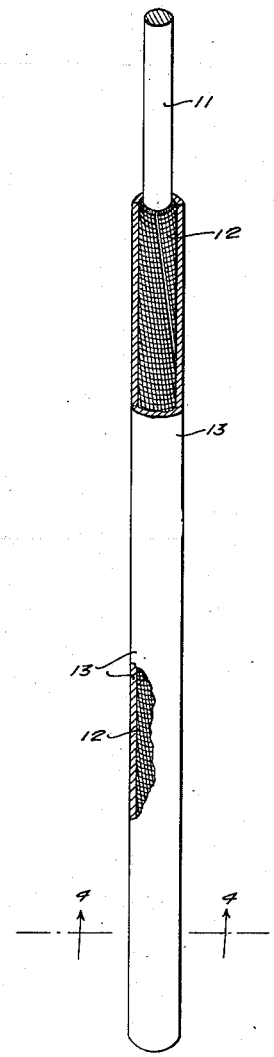
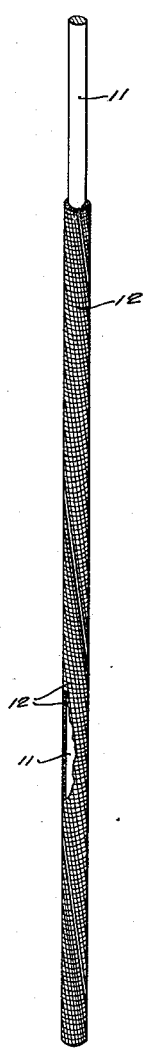
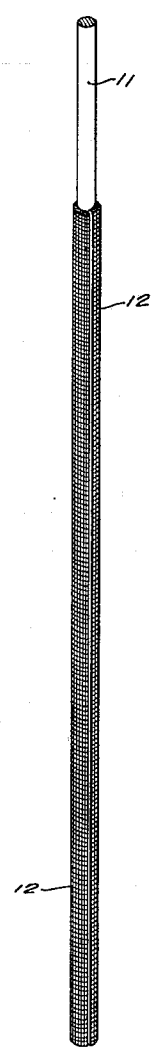
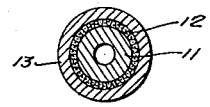
INVENTOR
WILBER B. MILLER
BY
ATTORNEY Patented Dec. 8, 1936

2,063,182

UNITED STATES PATENT OFFICE 2,063,182

ARC WELDING ELECTRODE

Wilber B. Miller, Flushing, N. Y., assignor, by mesne assignments, to Union Carbide and Carbon Corporation, a corporation of New York Application April 15, 1933, Serial No. 666,235

7 Claims. (Cl. 219—8)

This invention relates to welding rods and especially to a coated welding rod suitable for use as an electrode in metallic arc welding. An object of this invention is to provide a welding rod having a coating including arc stabilizing material and especially a rod having a fabric in contact with the bare rod. A further object of the invention is to provide means whereby a thick coating is held in firm contact with the rod. These and other objects of the invention will be evident from the following specification having reference to the accompanying drawing, in which Fig. 1 is a view of a rod illustrating one embodiment of my invention.

Fig. 2 is a view of the partially completed rod which is adapted in the form shown for use in welding light structures.

Fig. 3 is a view of a modified form of rod which may be used as shown or which may be coated in the manner shown in Fig. 1; and Fig. 4 is a section on the line 4—4 of Fig. 1.

In the drawing reference numeral 11 designates the electrode core which is of metal and generally of ferrous metal; 12 designates a layer of cellulosic material which is described more in detail below; and 13 designates a layer of flux or slag forming material.

In carrying out my invention the bare steel electrode 11 is wrapped with a cellulosic material 12. I use a strip or tape of fabric. While I prefer woven cotton fabric, I may also use a felted cotton fabric or a linen fabric of vegetable material. The strip may be wound spirally about the rod as shown in Fig. 2 or applied longitudinally as shown in Fig. 3. This strip may be first impregnated with the binder or adhesive or the ends only of the fabric may be secured with adhesive and the coated or wrapped electrode then sprayed with or dipped in adhesive and baked. I prefer to use waterglass as an adhesive. Should it be desired to use the covered electrode without an additional coating, a small amount of arc stabilizing substance, may be added to the adhesive, or very thin coatings such as are disclosed in Kjellberg Patent 1,115,317 may be used. However, for heavy welding operations the arc stabilizing material, together with other flux material, is formed in a slurry and applied outside the fabric by dipping or spraying. This outside cover may also be applied by extrusion. After the covering is in place the electrode is dried or baked.

In forming the outer covering of flux mixtures I have found the following compositions suitable:

| | Parts by weight | | | | | | | |
|---|---|---|---|---|---|---|---|---|
| | I | II | III | IV | V | VI | VII | VIII |
| Slip clay | 50 | 50 | | | 15 | 40 | 40 | 15 |
| Iron oxide | 30 | | | | | 30 | 30 | 20 |
| Calcium carbonate | 10 | 13 | 50 | 50 | 50 | 20 | 20 | 50 |
| 75% ferro-silicon | 3 | 3 | | | | | 2 | |
| 65% high carbon ferro-chrome | 3 | .5 | | | 5 | | 5 | 6–12 |
| Manganese ore | 5 | 5 | | | | 5 | 5 | |
| Carbonaceous material | 5 | | 5 | 5 | 5 | 5 | 5 | |
| Feldspar | 20 | 19 | | | | 20 | 20 | 15 |
| Rutile | | 5 | 10 | 10 | 10 | 10 | 10 | 10 |
| Silica | | | 40 | 40 | 30 | | | 30 |
| Ferro-manganese | | | | 8 | 8 | | 8 | 0–15 |

The flux mixtures are mixed with diluted waterglass to a consistency suitable for dipping. The mixture containing iron oxide gives better results with thick coatings than with thin coatings. The slip clay is preferably of the type known as Albany slip clay and its composition is set forth in my copending application Serial No. 658,023, filed February 23, 1933. Using a rod, containing approximately 0.14% carbon and 0.50% manganese, coated with a strip of loosely woven muslin and dipped in flux mixture I, I have obtained welds having a strength of over 71,000 lbs. per square inch with good ductility.

I claim:

1. An electrode for arc welding comprising a ferrous core, a woven fabric of vegetable fibers in direct contact with said core, and a coating consisting of slip clay, an alkaline earth carbonate, ferrochrome, carbonaceous material, rutile, silica and ferro-manganese.

2. A welding electrode comprising a ferrous core having a layer of cellulosic material in contact with said core and flux material surrounding said cellulosic material, said flux material having the following approximate composition by weight: slip clay 50 parts, iron oxide 30 parts, calcium carbonate 10 parts, ferrosilicon 3 parts, ferrochrome 3 parts, manganese ore 5 parts, carbonaceous material 5 parts, feldspar 20 parts.

3. An electrode for arc welding comprising a ferrous core, an unpurified cellulosic fabric wrapping immediately surrounding said core and a coating comprising slip clay, an alkaline earth carbonate, ferro-silicon, ferro-chrome, a manganese compound, rutile and carbonaceous material.

4. An electrode for arc welding comprising a ferrous core, an unpurified cellulosic fabric wrapping surrounding said core and in contact therewith, and a coating comprising calcium carbonate about 50 parts, carbonaceous material about 5 parts, rutile about 10 parts and silica about 40 parts.

5. An electrode for arc welding comprising a ferrous core, an unpurified cellulosic fabric immediately surrounding said core and a coating consisting of slip clay, calcium carbonate, ferro-chrome, carbonaceous material, rutile, silica and ferro-manganese.

6. An arc welding electrode comprising a metallic core, a single thickness of a fabric of vegetable material surrounding said core and in direct contact with the entire core surface, an adhesive, and an arc stabilizing material and fluxing material forming a continuous coating surrounding said fabric.

7. An arc welding electrode comprising a metallic core, a single thickness of a fabric of vegetable material surrounding said core and in direct contact with the entire core surface, said fabric being impregnated with an adhesive of a material which also serves as a flux, and a coating of a mixture of arc stabilizing material and fluxing material of a different composition from the adhesive surrounding said fabric.

WILBER B. MILLER.

CERTIFICATE OF CORRECTION.

Patent No. 2,063,182.   December 8, 1936.

WILBER B. MILLER.

It is hereby certified that error appears in the printed specification of the above numbered patent requiring correction as follows: Page 1, first column, line 32-33, strike out the words "of vegetable material" and insert the same after "fabric" and before the period in line 30; and that the said Letters Patent should be read with this correction therein that the same may conform to the record of the case in the Patent Office.

Signed and sealed this 16th day of February, A. D. 1937.

(Seal)   Henry Van Arsdale
Acting Commissioner of Patents.